(12) United States Patent
Price (10) Patent No.: US 9,871,338 B2
(45) Date of Patent: Jan. 16, 2018

(54) PUMP COMBINER FOR MULTI-CLAD FIBERS

(71) Applicant: NLIGHT, INC., Vancouvr, WA (US)

(72) Inventor: Raymond Kirk Price, Redmond, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/397,719

(22) Filed: Jan. 3, 2017

(65) Prior Publication Data
US 2017/0194761 A1 Jul. 6, 2017

Related U.S. Application Data

(60) Provisional application No. 62/274,131, filed on Dec. 31, 2015.

(51) Int. Cl.
*G02B 6/28* (2006.01)
*H01S 3/094* (2006.01)
*H01S 3/067* (2006.01)
*H01S 3/16* (2006.01)

(52) U.S. Cl.
CPC .... *H01S 3/094053* (2013.01); *H01S 3/06733* (2013.01); *H01S 3/094007* (2013.01); *H01S 3/1603* (2013.01)

(58) Field of Classification Search
CPC ........ G02B 6/28; G02B 6/125; G02B 6/2813; G02B 6/2804; G02B 6/2817
See application file for complete search history.

(56) References Cited

U.S. PATENT DOCUMENTS

| | | | |
|---|---|---|---|
| 8,412,015 B2 * | 4/2013 | Digiovanni | G02B 6/02019 385/123 |
| 8,873,134 B2 | 10/2014 | Price et al. | |
| 9,195,006 B1 | 11/2015 | Hoener et al. | |
| 9,366,806 B2 * | 6/2016 | Taunay | G02B 6/03644 |
| 9,494,739 B2 | 11/2016 | Price et al. | |
| 2016/0178849 A1 | 6/2016 | Hoener et al. | |

* cited by examiner

*Primary Examiner* — Jennifer Doan (57) ABSTRACT

Disclosed herein is a fiber pump combiner, comprising, a multi-clad fiber comprising an outer cladding layer and an inner cladding layer, a plurality of tapered trenches formed in the inner cladding layer and a plurality of pump fibers, wherein the plurality of pump fibers are tapered and fused into corresponding ones of the plurality of tapered trenches.

18 Claims, 7 Drawing Sheets

PUMP COMBINER FOR MULTI-CLAD FIBERS

TECHNICAL FIELD

Generally, the field of the present disclosed technology relates to combining optical power in diode pumped laser. More particularly, the present disclosed technology relates to pump combiners for multi-clad fibers.

BACKGROUND

High power semiconductor lasers are used to pump cladding pumped fiber lasers. Fiber lasers are capable of producing output power in the multiple kW range and are used in a variety of applications that require high output power such as cutting, welding, material processing (e.g., marking, engraving, and cutting) and directed energy. Achieving the power levels required for these applications is often accomplished by combining the fiber-coupled outputs of multiple diode modules to pump active fibers.

When combining diode pumped fibers it is often convenient to perform the beam combination of the coupled fibers with a fiber based beam combiner that couples a plurality of optical fibers to a single signal fiber. Conventionally, combining multiple fibers to achieve higher power can either reduce optical efficiency or beam quality of the pump fibers. High power (kilowatt-class) fiber pump combiners are vulnerable to small imperfections and losses which have significant impact on reliability.

Commonly-used double clad fibers use a low-index polymer buffer to guide high power pump light in the fiber. When guiding multiple kW of pump power this glass-polymer interface is very sensitive to polymer recoating delamination, defects in the buffer, and contamination, chips, and scratches that occur during the fiber handling and manufacturing process. These defects are a major source of fiber failure in the factory and in the field.

By guiding diode laser pump light in an active fiber with a glass-glass interface, many of the disadvantages of glass/polymer interface can be overcome. In such multi-clad fibers, fluorosilicate glass cladding guides the pump light, making the fiber robust to damage or contamination that occurs during fiber stripping, cleaning, cleaving, splicing and recoating. By guiding the pump light with a glass to glass interface, the buffer avoids the vast majority of interaction with the pump light, thus preventing the gradual degradation or burning that can occur with traditional double clad fiber. One draw-back of glass-clad fibers is that there aren't any developed pump combiners specifically designed for use in glass-clad fibers that leave the fiber core unperturbed.

DETAILED DESCRIPTION OF THE DISCLOSED TECHNOLOGY

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Disclosed herein is a pump combiner designed to leave the active fiber core undisturbed, allowing for counter propagation pumping of the laser amplifier, while efficiently coupling multiple kilowatts of power into the active fiber. The pump combiner preserves the brightness of the pump laser enabling compatibility with multi-clad active fibers and leaves the signal core unperturbed.

This combiner includes tapered trenches cut into the side of a multi-clad fiber. The trenches may be designed to be cut sufficiently deep for the pump fibers to lay into the grooves without disturbing an active core of the fiber, ensuring little to no loss or degradation of the beam quality or polarization purity of the signal beam. These grooves also provide improved fiber handling by guiding the pump fibers into a specific position of the pump combiner, enabling low-loss and brightness preserving pump coupling. An additional advantage of these grooves is the improved beam quality preservation of the pump fibers by reducing the effective area of the pump and signal fibers. Thus, the pump combiner design will reduce optical loss, improve manufacturability, and improve the robustness/manufacturability of kW-class fiber laser systems. Furthermore, the disclosed pump combiner is compatible with both round and other shaped fibers and with polarization-maintaining fibers.

The disclosed pump combiner is compatible with multi-clad fiber, for example, polymer-clad fibers and/or glass-clad fibers having a signal core wherein the signal core is a single mode core or a few mode core (i.e., large mode area fibers). The disclosed pump combiner efficiently launches the pump light into the active fiber while simultaneously supporting the high output power of the signal beam. The disclosed pump combiner is low loss for both the signal and pump fibers which aids in avoiding excessive heat load on the pump combiner and maintaining high system efficiency, and preserving the brightness of the pump modules. In addition, the disclosed pump combiner does not disturb the high beam quality and high polarization purity required for high power systems. The disclosed pump combiner addresses all these issues and provides a superior solution in terms of pump brightness preservation and manufacturing robustness compared to existing pump signal combiner technologies.

Figure 1A:
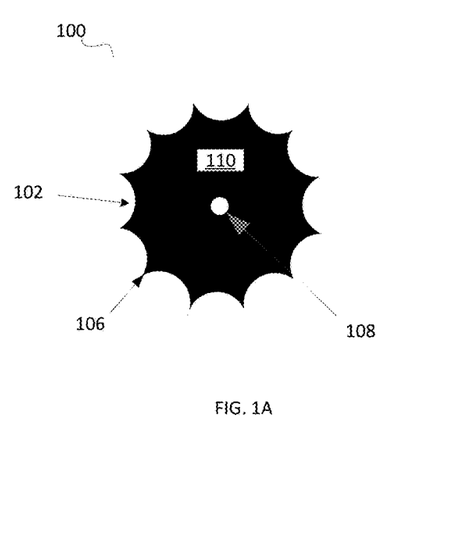
FIG. 1A depicts a cross-sectional view of an example of a multi-clad fiber configured to be combine with one or more pump fibers according to aspects of this disclosure.

FIG. 1A depicts a cross-sectional view of an example of a multi-clad fiber 100 configured to be combine with one or more pump fibers. Multi-clad fiber 100 may be any of a variety of fibers including glass-clad fiber or polymer clad fiber. Multi-clad fiber 100 may have an outer cladding layer 104 (not shown in FIG. 1A, see FIG. 1B) that is stripped away, an inner cladding layer 106 and a signal layer 108. These combiners are compatible with a variety of fibers including hexagonal multi-clad fibers, D-shaped glass-clad fibers, chirally-coupled fibers and pulsed mode (PM) fibers, for example. Such combiners may also be applied to traditional polymer-clad fibers as well.

In an example, multi-clad fiber 100 has tapered trenches 102 configured to receive and fuse to correspondingly tapered pump fibers. Tapered trenches 102 can be formed to cut through glass cladding. A length of multi-clad fiber 100 may be stripped of outer cladding 104 so that trenches 102 may be formed in inner cladding layer 106. The depth of the trenches 102 may be tapered along the length of the multi-clad fiber 100 to prevent pump fibers from having to bend significantly. The depth can range from about equal to a radius of the pump fibers to be disposed in trenches 102 to a depth of about zero. In other examples, the depths may be different and claimed subject matter is not so limited.

Outer cladding 104, inner cladding layer 106 and signal layer 108 may comprise glass such as silica, fluorosilica, doped silica, or the like or any combinations thereof. The trenches for the pump combiner disclosed herein may also be formed in Yb-doped fibers, Yb-doped PM fibers, Er-doped fibers, Er-doped PM fibers, Thulium-doped fibers, and Tm-doped PM fibers.

In some examples, trenches 102 may be formed in both outer cladding layer 104 and inner cladding layer 106 so that stripping of the outer cladding layer 104 may be eliminated as a fabrication step. Trenches 102 may be formed in multi-clad fiber 100 by a variety of methods known to those of skill in the art. For example, trenches 102 may be etched using photolithographic methods, laser ablation, ablated with a $CO_2$ laser, a plasma arc, or the like or any combinations thereof. In an example, multi-clad fiber 100 may be an active fiber including signal layer 108. In another example, multi-clad fiber 100 may be a passive fiber without a signal layer 108.

Figure 1B:
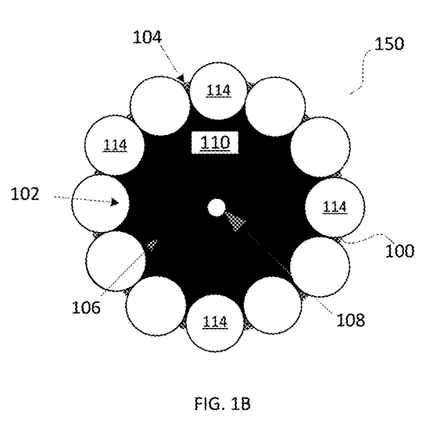
FIG. 1B depicts a cross-sectional view of an example of a combiner assembly comprising multi-clad fiber coupled to a plurality of pump fibers.

FIG. 1B depicts a cross-sectional view of an example of an assembly 150 (i.e., a combiner) comprising multi-clad fiber 100 coupled to a plurality of pump fibers 114. For clarity, several pump fibers 114 are labeled with element numbers. The view in FIG. 1B is facing fiber-to-pump interface surface 110. Pump fibers 114 may be tapered and fused into respective tapered trenches 102. Outer cladding layer 104 can be seen between pump fibers 114. The trenches are cut just where they are needed, so the cladding can extend over the remaining length of the fiber.

In an example, tapered pump fibers 114 are formed by removal of protective outer cladding layers, for example, through a wet etch or other methods known to those of skill in the art. In another example, pump fibers 114 may be fabricated with a coreless fiber. Pump fibers 114 are then tapered to match the tapered trenches 102 on the multi-clad fiber 100. Tapered pump fibers 114 may then be inserted into the tapered trenches 102, where pump fibers 114 and multi-clad fiber 100 are spliced together by fusing them. Combiner assembly 150 can be recoated with buffer material, if desired.

Fusing of tapered pump fibers 114 into trenches 102 may be accomplished by any method known to those of skill in the art. For example, pump fibers 114 may be collapsed onto multi-clad fiber 100 using a $CO_2$ laser, plasma arc, van der Waals forces or the like or any combinations thereof.

Using a $CO_2$ laser or chemical etching to fabricate the tapered trenches may provide precision necessary to only penetrate to a required depth of the fiber, thus leaving signal layer 108 and stress rods undisturbed. These tapered trenches 102 and tapered pumps 114 can form a "ball and socket" type fit to aid in the alignment of the pump 114 and multi-clad fiber 100. The taper of respective pump fibers 114 may match the tapers of trenches 102 such that the pump fibers 114 when mated to trenches 102 come to a point flush with a surface of inner cladding layer 106. Fusing pumps 114 into tapered trenches in this way significantly reduces the outer diameter of a pump combiner assembly 150, thus improving combiner assembly 150 brightness preservation.

In an example, inner cladding 106 may be an active fiber. Insertion of the pump fibers 114 into an active fiber rather than use of an intermediate passive fiber may eliminate the loss and beam-quality degradation associated with a splice between active and passive fiber, and it facilitates power scaling by minimizing the total fiber length (increased threshold for parasitic nonlinear processes). Furthermore, the use of a $CO_2$ laser or comparable cutting technique to taper pumps 114 can limit damage to pump fiber integrity as compared to removing fiber material with mechanical means. The clean, non-contact nature of $CO_2$-laser-based processing greatly facilitates fabrication of devices suitable for high-power operation by eliminating sources of fiber contamination and damage resulting in a monolithic combiner with extremely high power handling capability due to low loss for the pump fibers 114 and low loss for the signal. This pump signal combiner assembly 150 can be integrated in either active or passive fiber, for the development of high power fiber laser systems. Moreover, assembly 150 can be easily incorporated into pulsed mode (PM), large mode area (LMA), and chirally coupled fibers.

Figure 1C:
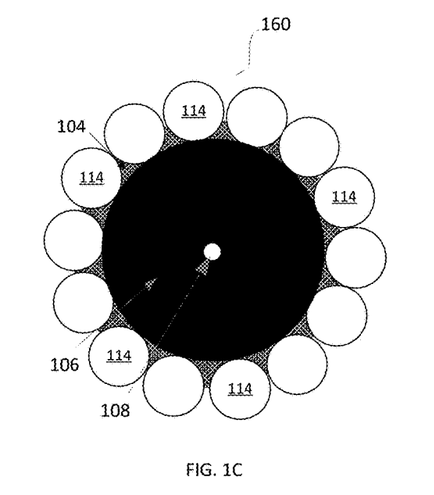
FIG. 1C depicts an example of an "over-sleeve" type combiner.

FIG. 1C depicts an example of a conventional "over-sleeve" type combiner 160 including pump fibers 114, outer cladding layer 104, inner cladding layer 106, and core 108. The over-sleeve combiner assembly 160 has pump fibers 114 disposed on the outer surface of inner cladding 106. In comparison to over-sleeve combiner 160, combiner 150 (see FIG. 1B) has substantially improved beam quality preservation due in part to a substantially reduced diameter of combiner 150. Actively forming inner cladding 106 to accept the pump fibers 114, the outer diameter of combiner 150 is substantially reduced as compared to over-sleeve combiner assembly 160.

There are at least two issues that affect the brightness preservation of a pump/signal combiner: the outer diameter of the combiner and the fill factor. In an example, 200/220 μm pump fibers with a power content at 0.15 NA and an 800 μm cladding diameter active fiber were used to compare brightness preservation of combiner assembly 150 versus over-sleeve combiner assembly 160. Combiner 150 in this example having partially embedded pump fibers 114 has an outer diameter of approximately 1.0 mm. Dead space between pump fibers 114 isn't utilized, thus eliminating the dead space which is a primary source of brightness loss improves brightness preservation. When taking these two effects into consideration, such a combiner 150 increases the NA of the pump modules from 0.15 NA to approximately 0.22 NA. As a comparison, the outer diameter of the "over-sleeve" combiner 160 is substantially larger at 1.24 mm, and such a combiner couples all of the dead space between pump fibers 114 into fiber 100. When the over-sleeve pumps 114 are collapsed from 1.24 mm down to the 800 μm fiber, the expected NA of the pump modules is increased from 0.15 to 0.36 NA. This high NA is incompatible with multi-clad fibers, thus reducing the utility of the over-sleeve approach. However, combiner 150 is compatible with injecting light into a multi-clad fibers such as triple-clad fiber (TCF). Additionally, combiner assembly 150 can be utilized for co-propagation and counter-propagation pumping.

Figures 2A, 2B, 2C:
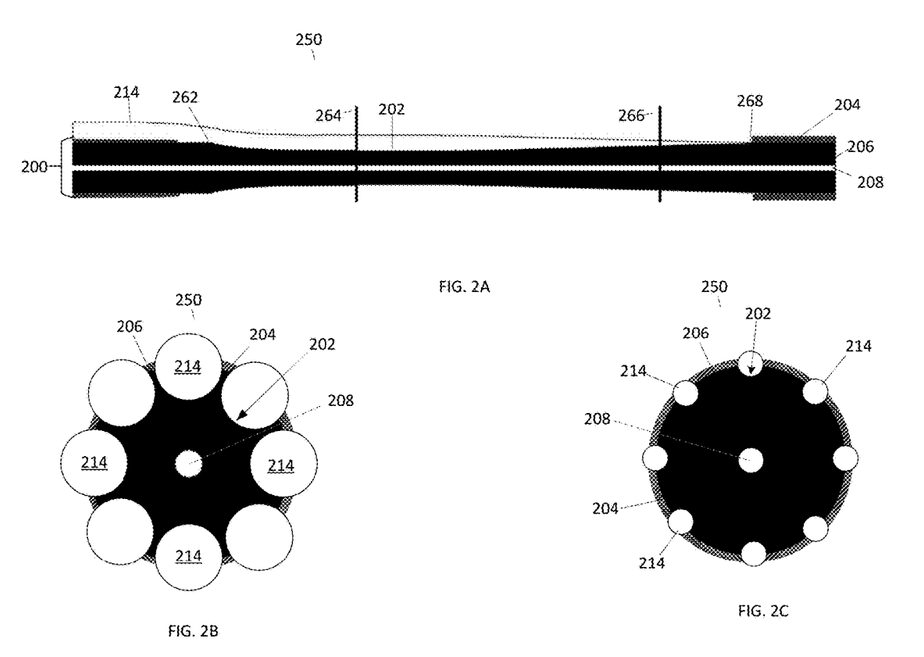
FIG. 2A depicts a side cross-sectional view of an example of a combiner assembly for use with glass clad fiber according to aspects of this disclosure
FIG. 2B depicts a cross-sectional view of an example of a combiner assembly showing a plurality of pump fibers fused into tapered trenches in inner cladding according to aspects of this disclosure.
FIG. 2C depicts a cross-sectional view of an example of a combiner assembly showing the plurality of pump fibers fused into tapered trenches in inner cladding according to aspects of this disclosure.

FIG. 2A depicts a side cross-sectional view of an example of a combiner assembly 250 for use with multi-clad fiber 200 showing one pump fiber 214 of a plurality of pump fibers 214 fused into tapered trench 202. Multi-clad fiber 200 may comprise a glass-clad fiber and/or polymer-clad fiber. In an example, pump fiber 214 should be bent very gradually to prevent optical power losses. Insertion of pump fiber 214 (as well as other pump fibers 214 of the plurality) into inner cladding 206 may began at point 262 where outer cladding 204 has been stripped away. Pump fiber 214 may be embedded to its greatest depth in inner cladding 206 at point 264 and may gradually taper to point 268. A cross-section of combiner assembly 250 at point 264 is shown in FIG. 2B. A cross-section of combiner assembly 250 at point 266 is shown in FIG. 2C.

FIG. 2B depicts a cross-sectional view of an example of a combiner assembly 250 showing a plurality of pump fibers 214 disposed and/or fused into tapered trenches 202 in inner cladding 206. The cross-section depicted in FIG. 2B is a plane through combiner assembly 250 at point 264 of FIG. 2A. As can be seen in FIG. 2B, pump fibers 214 are deeply embedded into inner cladding 206, are untapered and have their greatest cross-sectional area. In an example, the tapered trenches 202 do not extend into signal layer 208.

FIG. 2C depicts a cross-sectional view of an example of a combiner assembly 250 showing the plurality of pump fibers 214 disposed and/or fused into tapered trenches 202 in inner cladding 206. The cross-section depicted in FIG. 2C is a plane through combiner assembly 250 at point 266 of FIG. 2A. As can be seen in FIG. 2C, pump fibers 214 are tapered to a smaller diameter and are less deeply embedded into inner cladding 206 than fibers 114 at point 264 depicted in FIG. 2B. Furthermore, due to the extent to which pump fibers 214 have been tapered the cross-sectional area of fibers 214 is substantially reduced compared to the cross-sectional area of pump fibers 214 shown in FIG. 2B.

Figure 3:
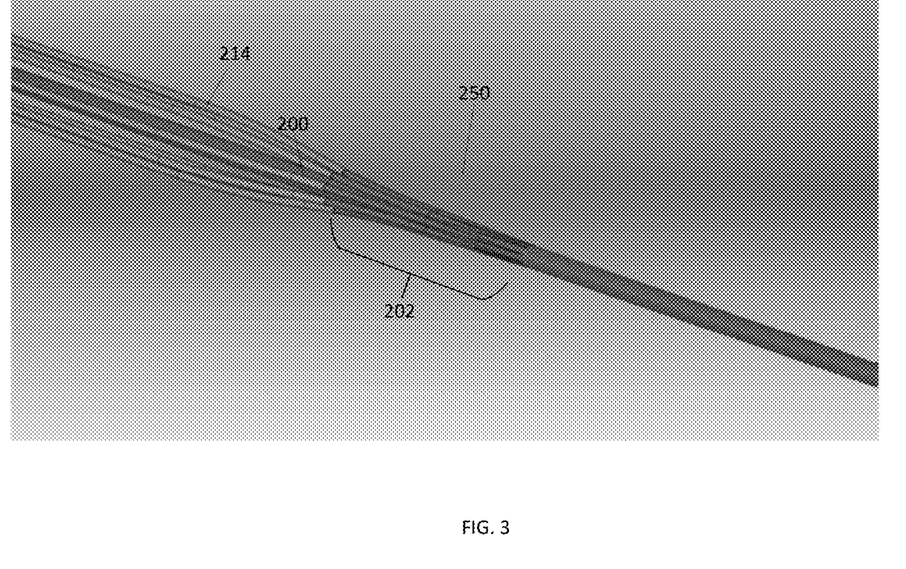
FIG. 3 is a 3-D schematic of an example of a combiner assembly according to aspects of this disclosure.

FIG. 3 is a 3-D schematic of an example of combiner assembly 250 configured to inject light into a triple-clad fiber (TCF) by mating pump fibers 214 into tapered trenches 202 etched into outer cladding 204 and inner cladding 206 of multi-clad fiber 200. Multi-clad fiber 200 may be an active or passive fiber. Combiner assembly 250 can be utilized for co-propagation and counter-propagation pumping while maintaining the integrity of the multi-clad fiber 200.

Combiner assembly 250 addresses several challenges associated with developing a pump suitable for co-propagation and counter-propagation pumping of high power fiber laser systems enabling efficient launch of pump power into active fiber while simultaneously supporting the high output power of the signal beam. Combiner assembly 250 is configured to be low loss for both signal and pump to avoid excessive heat load on the pump combiner 250 and to maintain high system efficiency, and preserves the brightness of pump modules. In addition, combiner 250 is configured to not disturb the high beam quality and high polarization purity required for directed energy and other laser systems.

Figure 4A:
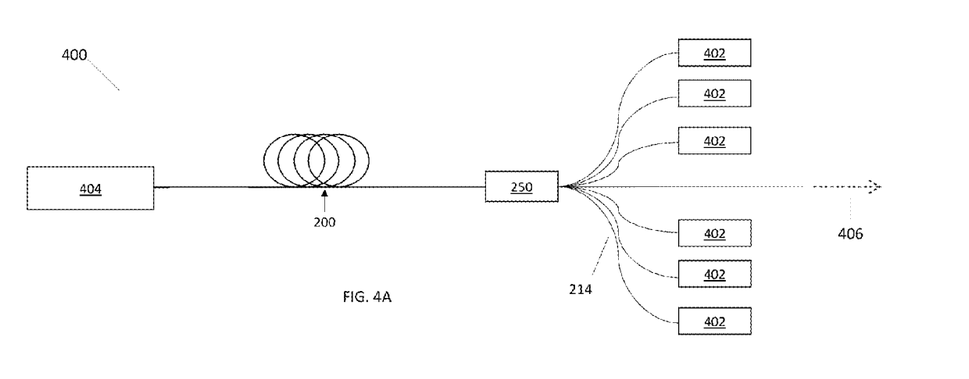
FIG. 4A is a schematic depicting an example of a system comprising a counter-pumped fiber amplifier laser architecture incorporating a combiner assembly including tapered pump fibers fused into tapered trenches according to aspects of this disclosure
Figure 4B:
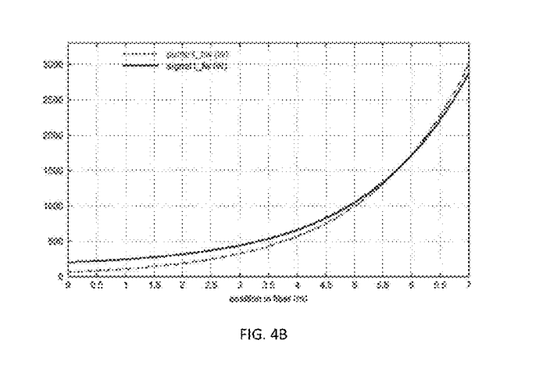
FIG. 4B is a graph illustrating counter-pumped amplifier models according to aspects of this disclosure.

FIG. 4A is a schematic depicting an example of a system 400 comprising a counter-pumped fiber amplifier laser architecture incorporating combiner assembly 250 including tapered pump fibers 214 fused into tapered trenches 202. System 400 includes a plurality of diode laser modules 402 coupled to multi-clad fiber 200 by combiner assembly 250. Multi-clad fiber 200 is coupled to fiber-coupled master oscillator 404 to boost output power through the counter-pumped signal 406. System 400 is configured to optimize overlap between the pump light and the signal (fiber laser) light. With system 400 pump absorption is optimized and fiber length is reduced (lower nonlinearities). FIG. 4B is a graph illustrating counter-pumped amplifier models demonstrating the way the signal grows in counter-pumped system 400 over the length of the fiber.

Figure 5:
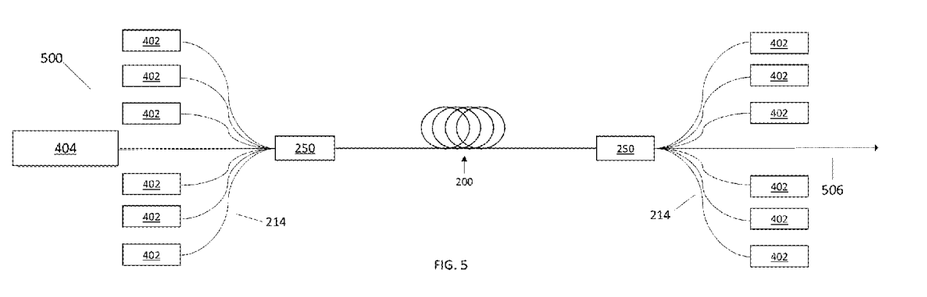
FIG. 5 is a schematic depicting an example of a system comprising a co-pumped and counter-pumped master oscillator pumped amplifier (MOPA) fiber laser according to aspects of this disclosure.

FIG. 5 is a schematic depicting an example of a system 500 comprising a co-pumped and counter-pumped MOPA fiber laser architecture incorporating combiner assemblies 250 including tapered pump fibers 214 fused into tapered trenches 202. System 500 includes a plurality of diode laser modules 402 coupled via combiner assemblies 250 to either end of multi-clad fiber 200. Multi-clad fiber 200 is further coupled to fiber laser master oscillator 404 to boost output power and generate co- and counter pumped signal 506. System 500 is configured to optimize overlap between the pump light and the signal (fiber laser) light. With system 500 pump absorption is optimized and fiber length is reduced (lower nonlinearities).

Figure 6A:
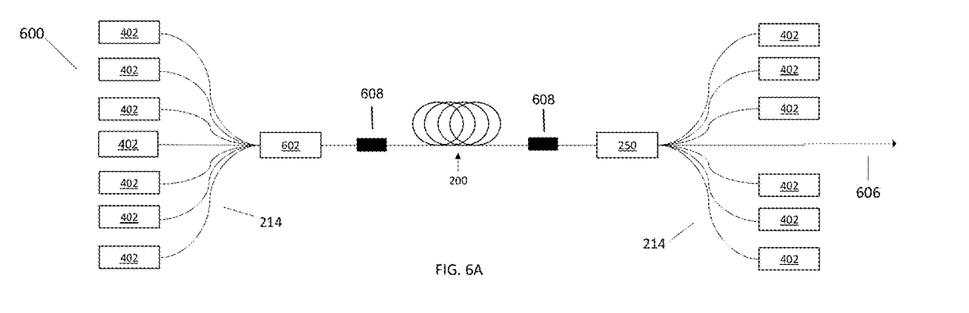
FIG. 6A is a schematic depicting an example of a system comprising a co-pumped and counter-pumped fiber laser architecture incorporating a combiner assembly including tapered pump fibers fused into tapered trenches according to aspects of this disclosure.

FIG. 6A is a schematic depicting an example of a system 600 comprising a co-pumped and counter-pumped fiber laser architecture incorporating combiner assembly 250 including tapered pump fibers 214 fused into tapered trenches 202. System 600 includes a plurality of diode laser modules 402 coupled through combiner assembly 250 to multi-clad fiber 200 via pump fibers 214. On the opposite side, pump fibers 214 connecting the remaining laser diode modules 402 are coupled to multi-clad fiber 200 via a standard combiner 602. The same pumps can be used on either side. They are typically passive fibers with 200/220 or 105/125 µm fiber diameter. Optional structure 608 may help control unwanted light in system 600. System 600 includes co- and counter-pumped fiber laser architecture. It is similar to the co- and counter-pumped MOPA architecture described with respect to FIG. 5A; however, the power output in signal 606 may be roughly double the input pump power. By simultaneously utilizing co- and counter-directional pumping, higher output power levels can be achieved with the same pump modules and similar length of fiber.

Figure 6B:
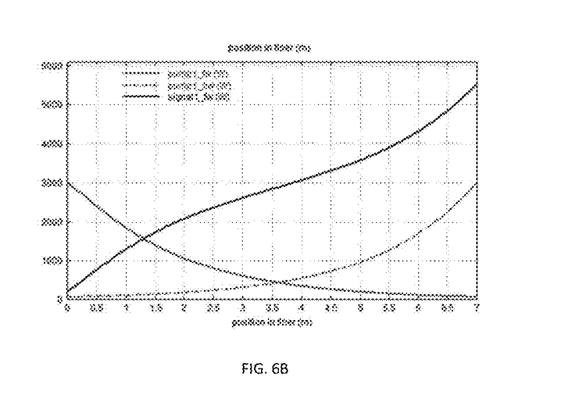
FIG. 6B is a graph illustrating co- and counter-pumped pump and signal power levels of a co- and counter pumped fiber laser according to aspects of this disclosure.

FIG. 6B is a graph illustrating co- and counter-pumped amplifier models demonstrating the way the signal grows in counter-pumped system 600 over the length of the fiber. By simultaneously utilizing co- and counter-directional pumping, higher output power levels can be achieved with the same pump modules and similar length of fiber.

Figure 7:
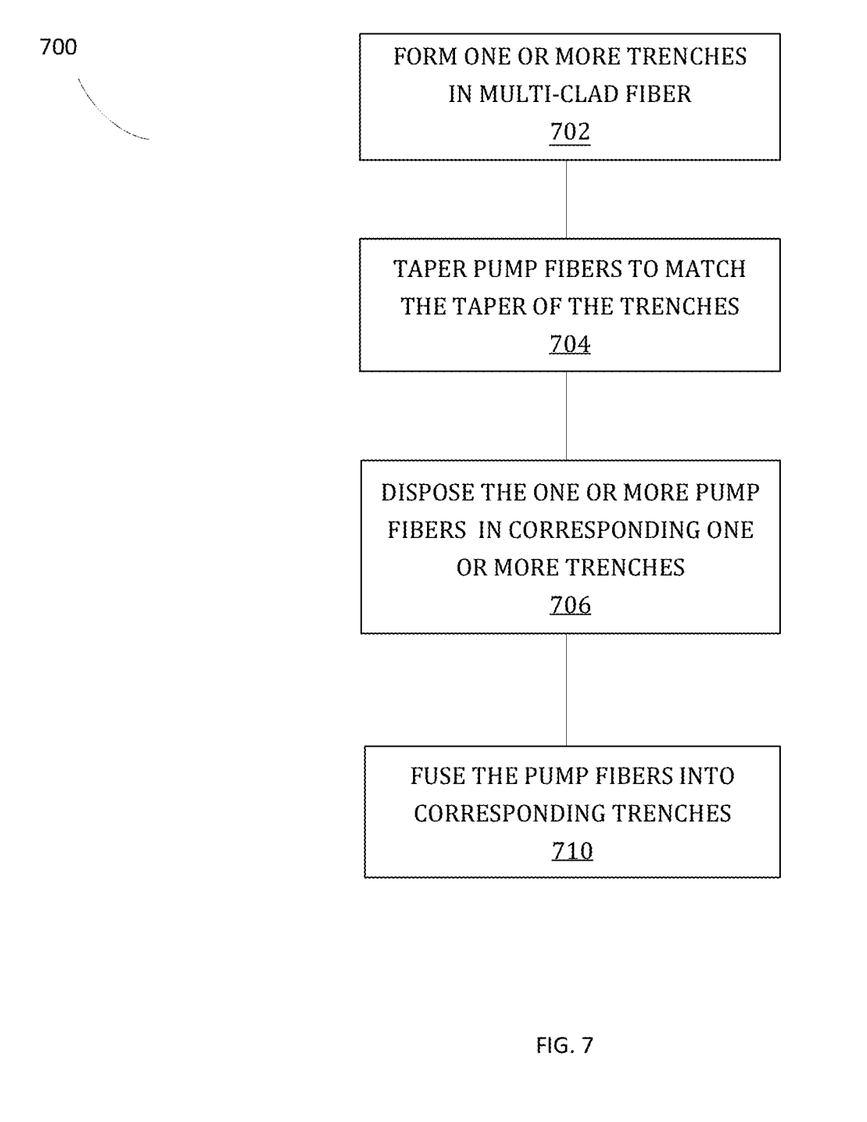
FIG. 7 illustrates a process for forming a combiner assembly according to aspects of this disclosure.

FIG. 7 illustrates a process 700 for forming combiner assembly 250. Process 700 begins at block 702 wherein one or more trenches 202 are formed in multi-clad fiber 200. The trenches may be formed in an inner cladding of a multi-clad fiber. The trenches are tapered. Process 700 moves to block 704 where the pump fibers are tapered to match the taper of the trenches. Process 700 moves to block 706 where the one or more pump fibers are disposed in corresponding one or more trenches. Process 700 moves to block 708 where the pump fibers are fused into corresponding trenches. Process 700 may be adapted to be used on a glass-clad fiber and/or a polymer clad fiber and claimed subject matter is not limited in this regard.

It is thought that the present disclosed technology and many of the attendant advantages thereof will be understood from the foregoing description and it will be apparent that various changes may be made in the parts thereof without departing from the spirit and scope of the disclosed technology or sacrificing all of its material advantages, the forms hereinbefore described being merely exemplary embodiments thereof.

What is claimed is:

1. A fiber pump combiner, comprising:
    a multi-clad fiber comprising an outer cladding layer and an inner cladding layer;
    a plurality of tapered trenches formed in the inner cladding layer; and
    a plurality of pump fibers, wherein the plurality of pump fibers are tapered and fused into corresponding ones of the plurality of tapered trenches.

2. The fiber pump combiner of claim 1, further comprising a core signal layer enclosed in the inner cladding.

3. The fiber pump combiner of claim 1, wherein the multi-clad fiber is an active fiber.

4. The fiber pump combiner of claim 1, wherein the multi-clad fiber is a passive fiber.

5. The fiber pump combiner of claim 1, wherein the outer cladding layer is stripped away from the inner cladding layer where the plurality of tapered trenches are formed.

6. The fiber pump combiner of claim 1, wherein the multi-clad fiber is glass-clad fiber.

7. The fiber pump combiner of claim 1, wherein the multi-clad fiber is a polymer clad triple clad fiber.

8. The fiber pump combiner of claim 1, wherein the outer cladding, inner cladding layer or signal layer, or any combinations thereof comprise silica, fluorosilica, Al-doped silica, silica, doped silica, or the like or any combinations thereof.

9. The fiber pump combiner of claim 1 wherein the fiber is Yb-doped, Tm-doped, Er-doped, or Ho-doped fiber or any combinations thereof.

10. A method for forming a pump fiber combiner, comprising:
    forming a trench in an inner cladding of a multi-clad fiber, wherein the trench is tapered;
    tapering the pump fiber to match the taper of the trench;
    disposing the pump fiber in the trench; and
    fusing the pump fiber to the multi-clad fiber in the trench.

11. The method of claim 10, wherein the multi-clad fiber is a glass-clad fiber.

12. The method of claim 10, further comprising removing an outer cladding from a length of the multi-clad fiber prior to forming the trench.

13. The method of claim 10, wherein the trench is formed in both the outer cladding and the inner cladding.

14. The method of claim 10, wherein the trench is formed using photolithographic methods, mechanical forming, molding, laser ablation, a $CO_2$ laser, a plasma arc, or the like or any combinations thereof.

15. The method of claim 10, further comprising removing a protective outer layer encasing the inner cladding by wet etching, the method further comprising heating the pump fiber to form the taper in the pump fiber.

16. The method of claim 10, wherein the pump fiber is fabricated with a coreless fiber.

17. The method of claim 10, further comprising recoating the fused pump fiber and multi-clad fiber assembly with buffer material.

18. The method of claim 10, wherein a plurality of pump fibers are fused into a plurality of trenches formed in the multi-clad fiber, wherein fusing the pump fibers into the trenches is accomplished by collapsing the pump fibers onto multi-clad fiber using a $CO_2$ laser, plasma arc, van der Waals forces or the like or any combinations thereof.

* * * * *